United States Patent
Tang

(10) Patent No.: US 9,440,718 B1
(45) Date of Patent: Sep. 13, 2016

(54) SYSTEM AND METHODS OF USING UNMANNED UNDERWATER VEHICLES (UUVS) ALONG WITH TETHERS AND TETHERED DEVICES

(71) Applicant: Rujing Tang, Plano, TX (US)

(72) Inventor: Rujing Tang, Plano, TX (US)

( * ) Notice: Subject to any disclaimer, the term of this patent is extended or adjusted under 35 U.S.C. 154(b) by 0 days.

(21) Appl. No.: 14/689,932

(22) Filed: Apr. 17, 2015

(51) Int. Cl.
*B63G 8/00* (2006.01)
*B63G 8/08* (2006.01)
*B64C 39/02* (2006.01)

(52) U.S. Cl.
CPC ............... *B63G 8/001* (2013.01); *B63G 8/08* (2013.01); *B64C 39/024* (2013.01); *B63G 2008/005* (2013.01); *B64C 2201/128* (2013.01)

(58) Field of Classification Search
CPC .......... B63G 8/28; B63G 8/001; B63G 8/00; B63G 8/08; B63G 8/14; B63G 8/38; B63G 8/42; B63B 17/00; B63B 35/00; B63B 38/00; B63B 35/44
USPC ............ 114/312, 316, 318, 322, 382, 240 C, 114/21.2; 89/1.11
See application file for complete search history.

(56) References Cited

U.S. PATENT DOCUMENTS

| | | | |
|---|---|---|---|
| 2,353,360 A | 7/1944 | Ronning | |
| 3,783,441 A * | 1/1974 | Slawsky | F41G 7/00 114/21.2 |
| 5,675,116 A * | 10/1997 | Hillenbrand | B63G 8/28 114/21.2 |
| 6,325,015 B1 | 12/2001 | Garcia et al. | |
| 6,600,695 B1 * | 7/2003 | Nugent | B63G 8/42 114/312 |
| 8,256,336 B2 * | 9/2012 | Larkin | B63G 8/001 114/316 |
| 8,402,894 B1 | 3/2013 | McGuigan et al. | |
| 8,552,282 B1 | 10/2013 | Garcia et al. | |
| 2001/0032577 A1 * | 10/2001 | Swartout | B63B 21/56 114/382 |
| 2007/0017432 A1 * | 1/2007 | Farinella | B63H 25/50 114/382 |
| 2009/0020062 A1 * | 1/2009 | Fong | B63B 21/56 114/253 |

\* cited by examiner

*Primary Examiner* — Lars A Olson
(74) *Attorney, Agent, or Firm* — Eldredge Law Firm; Richard Eldredge

(57) ABSTRACT

The present invention comprises a plurality of UUVs, tethers and tethered devices. The devices that are tethered comprise explosive devices or acoustic devices. The UUV provides mobility and controllability for the tethers and the tethered devices. The tether is also used as a means to entangle target vessel's propeller. The entangled propeller's revolution moves the explosive device closer to the target vessel for denotation. The tether is made with high strength material whereby once entangled, it is difficult for the propeller itself or intervention to disentangle. The system has a detachable housing with fluid dynamic shape. The whole system is designed to submerge during operation. The system can be wirelessly controlled by a remote command center via satellite link, or by a nearby command center directly.

16 Claims, 5 Drawing Sheets

SYSTEM AND METHODS OF USING UNMANNED UNDERWATER VEHICLES (UUVS) ALONG WITH TETHERS AND TETHERED DEVICES

FIELD OF INVENTION

The present invention relates to a system and methods to patrol water territory, or to form blockade, or to weave a net, or to entangle a vessel, or to cause damage to a vessel, or to cause destruction to under water structures, or to break ice on water surface, or to move an iceberg, or to break an iceberg into smaller pieces.

BACKGROUND OF THE INVENTION

Traditional naval blockade is carried out with sea mines. However sea mines suffer from its relative ease of being detected and immobility. Sea mine sweeping vessels are able to neutralize sea mines with mature techniques. Earlier in the military history, iron chains were used to deny access to a port or a city. However in modern warfare, chain blockade ceases to be a practical means to achieve effective blockade. Submarines are frequently used to stealthily patrol a vast water territory and carry out strategic or tactical attack missions. As a tactical weapon, submarines have proved highly effective since its invention. However, submarines are typically manned and very expensive. Furthermore, detection of submarine has greatly improved over the years, which makes submarines more vulnerable. There is a pressing need to have an inexpensive, stealthy, powerful and smart marine weapon that is able to carry multiple types of missions.

SUMMARY OF THE INVENTION

In one of the primary embodiments of the present invention, the system consists of two UUVs, an explosive device and a tether linking each of the UUV with the explosive device.

The linkage consists of two strands of high strength materials such as Kevlar running in parallel, and separated by plural of submersible structures in between them. The separating structures have buoyancy, which keep the tethers as a whole at proper depth. In one embodiment of the present invention, the separating structure has its own GPS sensor, a module to communicate with the UUVs, and a miniature propulsion of its own. In order to avoid the entanglement between the tethers and the separating structures, if a small propeller is used it could be placed in the middle section of the structure. Alternatively, a fish fin type of moving part could be used as propulsion means. The requisite power may be drawn from the environment, such as solar or wave energy, or from a battery. With each structure having its own propulsion and controllability, the movement of the tethers would be enhanced. The control of the tether is down to the granularity of the segment between two such separating structures. In another, simpler embodiment, the separating structure is a buoy, which provides buoyancy as well structural support to avoid the strands of the tethers to entangle. The choice should be made based on the specific applications of the system.

The link may extend as long as miles depending on the application. There is little technical restriction on how long the tethers can be. The tether's thickness varies based on parameters such as the length, the material strength, and the operating environment. In other embodiments of the present invention, there may be more than two separate strands of tethers running in parallel to enhance strength. In the case where there are more than two strands of tethers running in parallel, the supporting structure needs to be placed with appropriate intervals along the length of the tethers to physically separate the different strands, so that the strands of tethers do not entangle by themselves.

A typical UUV that can be used in the present invention has sensors, a communication and control unit, depth control unit, and a propulsion unit. The sensors comprise camera, depth sensor, sonar, gravity variation sensor or any other typical sensors used in military applications. The communication and control unit typically comprises a GPS receiver, a communication channel with the Command Center, a communication link with the other UUV in the system, and a communication link with the explosive device. The depth control unit is needed for proper depth control, which is important to its mobility, stealthiness, and operating modes. The propulsion unit provides mobility. Depending on the field application, the UUV may receive all instructions remotely from the Command Center or rely on the on-board command and control unit, or more realistically, a hybrid of both. The Command Center may based anywhere in the world. Communication between the Command Center and the embodiments of the present invention is through satellite link. In another embodiment, the UUV can communicate directly with the Command Center, if the Command Center is within direct communication range of the UUVs, by cable or wirelessly. For instance, a nearby vessel is able to communicate with the system in this embodiment. Yet another embodiment of the present invention employs underwater acoustic signals to communicate between the system and the Command Center. The choice of UUV models is broad, UUVs such as Bluefin-21 from Bluefin Robotics, Sea Stalker, or LTV 38 currently used by the US navy, or any other appropriate UUV models can be candidates. A primary embodiment of the present invention utilizes two UUVs. In this configuration, each UUV is able to communicate with the other wirelessly to coordinate action. The advantage of two UUVs is that it enables much sophisticated tactical maneuverability than a single UUV configuration. In theory more than two UUVs may also be used in one system, however it has to be balanced with operation complexity.

In one embodiment of the present invention, the explosive device may be a retrofitted traditional sea mine. In one embodiment, when more tactical option is desired, a traditional explosive device such as sea mine may also be retrofitted with wireless communication module to receive detonation signal from the linked UUVs or other adjacent UUVs, or commands from a command center.

In another embodiment of the present invention, the explosive device comprises thermite. Thermite is a pyrotechnic composition of metal powder, fuel and metal oxide. When ignited by heat, thermite undergoes an exothermic reduction-oxidation reaction. Most varieties are not necessarily explosive but can create brief bursts of high temperature in a small area. Thermites have diverse compositions. Fuels include aluminum, magnesium, titanium, zinc, silicon, and boron. Aluminum is common because of its high boiling point and low cost. Oxidizers include boron(III) oxide, silicon(IV) oxide, chromium(III) oxide, manganese(IV) oxide, iron(III) oxide, iron(II,III) oxide, copper(II) oxide, and lead(II,IV) oxide. Thermite in this embodiment of the present invention is used to accomplish destruction, welding or other tasks that require intense heat. Thermite has a unique feature that it can ignite and burn under water. For instance, one application is to have the embodiment of the present invention attach the thermite to the underwater part of the target vessel. The high temperature from thermite burning can seriously damage the vessel.

In one embodiment of the present invention, the system employs a detachable housing. The housing is water dynamic to increase the efficiency of mobility.

The system operates under two modes: patrol mode and engagement mode. In patrol mode, the system is deployed within the detachable housing in a water body. The whole system is calibrated in weight and the center of gravity, so it is able to submerge appropriated at desired depth range. The ability to submerge provides necessary protection from detection. In one embodiment, the system is powered by energy acquired from the environment. Solar energy and wave energy are good choices. Energy from environment makes the system capable of operation without losing power for prolonged period of time. Once deployed and operating in patrol mode, energy from the environment powers the system for many years. While in patrol mode, the system provides valuable reconnaissance information through the sensors of the UUVs. Thanks to the small footprint of the presence, the system is able to operate undetected for a prolonged period of time. The exact location at any given time remains elusive to unfriendly naval forces. If needed, the Command Center can move the system to areas of interest by parachuting or simply dropping the system in the water, or by vessel-based launch. The patrol mode enables the command center to reach areas with minimal asset exposure while maintaining presence and threat.

The engagement mode comprises two different types. The first type involves entanglement and the second type involves detonation of the explosive device. Switching from patrol mode to engagement mode starts with a command from the Command Center or the on board command and control unit of one UUV. The detachable housing is discarded first. Each UUV moves in differing direction from each other, thus extends the tethers to its desired length. The depth of the tether is at typical target vessels' propeller depth range. The depth is controlled by the UUV's submerge depth, in conjunction with the help of the submersible buoys attached to the tethers which also serves as structure support to separate the strands.

The goal is to let the target vessel's propeller entangle the tether and thereby moving the explosive device to the proximity for denotation. Once entangled, the enemy is going to find it hard to disengage the tether because the tether is made with high strength material such as Kevlar. In addition the enemy ship loses its ability to move which provides additional opportunity of being attacked by other means. Furthermore, because in most vessels the propeller and the rudder are placed in close proximity, entangling the rudder of the target vessel is a tactic for the system. It can result in at least partial inoperability of the rudder.

Once entangled, the propeller's continued revolution moves the explosive device even closer to the proximity of the target vessel. In addition, the UUVs at this point are able to drag the explosive device closer to the target vessel. At appropriate proximity to the hull of the target vessel, the explosive device detonates and subsequently damages the target vessel.

The system can be deployed in plurals to form a naval blockade. This type of blockade may become valuable in certain political or military scenarios. It allows for passive monitoring of the situation while being used as attacking weapon in short notice. Furthermore the presence of the present invention in patrol mode is hard to detect and prove.

The tethers are extended by the movements of the UUVs. The tethers' depth, orientation, length, and shape are under control by the UUVs. Different depth, orientation, length and shape help the system accomplish different tasks. For instance, extended tethers at target vessels' propeller depth helps form a blockade.

The system can be deployed to cover large area of water body by air. A manned or unmanned airplanes carries one or more systems over target areas. The systems are dropped or parachuted from the airplane to the water.

In one of the embodiment, the system may be able to draw energy from solar source, or any other environment sources such as wave energy. The goal is to have the system deployed in any water territory undetected for a prolonged period of time. During patrol mode, the system is still under the control of the commanding center. The system is able to change directions, depth, speed and operation based on instructions from the Command Center.

Electronic and magnetic wireless signals attenuate quickly with the submerge depth of the receiving antenna. The depth of patrol mode is adjusted based on needs. The system is able to receive GPS signals, communicate with the Command Center by cruising close to the water surface. Alternatively, in one of the embodiment, the system may communicate acoustically with the Command Center.

In order to achieve further stealthiness, one embodiment of the present invention allows only one directional communication in patrol mode. That is, only the Command Center sends signals to the system and no signal is sent from the system. As a result, based on the transmitted instruction history, which includes the position change instruction, the Command Center has a rough idea of the whereabouts of the system. When the system is switched to engagement mode, two-way communications are allowed whereby the system is enabled to talk to the Command Center, albeit at very judicious fashion to avoid being detected. The communication protocol would reference strategic submarine's communication protocol.

In engagement mode, the system swiftly sheds its water dynamic detachable housing and uncoils its tethers. The uncoiling of the tethers is accomplished by making the two UUVs moving in the differing directions, The UUVs' onboard battery is switched on for higher-powered maneuverability.

During engagement mode, the two UUVs move around a target vessel and encircle it. The target vessel would have a hard time getting out of the encirclement without being entangled or damaged by the explosive device.

If more than one of such systems is deployed, they are strategically positioned. Multiple formations can be considered for different goals. For instance, a tiered formation separates enemy ship groups; an elongated formation covers a large area for blockade against a port or a water front city. Several systems can be deployed to encircle enemy naval assets.

The blockade may work against enemy's port, city or other sea outlet. Blockade with the system may also be effective in straight, canal, river or any other waterways.

In one embodiment, the UUVs are able to control the detonation of the explosive device. If facing capturing by the enemy while in patrol mode, or the timing is deemed advantageous to detonate in engagement mode, the UUVs are able to send detonation signal to the explosive device.

Another application is to engage and attack submarines. Submarines have very limited means to detect objects around it. For fine element like tethers, there is no practical means for the submarines to detect. On the other hand, the UUVs carry sonar detection apparatus, which enables the system to detect the submarines. The system is able to approach a submarine stealthily thereby attempt to detonate against it.

The system is able to tell friendly forces from enemy forces because it has sensors and is equipped with communication and control modules to receive commands from the Command Center. This is advantageous compared to traditional sea mines.

The present invention can be used as a strategic weapon if deployed in large numbers and in strategic water territories. The possibility that tens of thousands inexpensive systems are deployed globally gives an important edge to the navy. The system is designed to make it hard to be detected, captured or destroyed.

One embodiment of the present invention allows the UUVs to be reused after a mission is accomplished. This is done through a releasable anchor that connects the tether and the UUV. The anchor is installed on the hull of the UUV. The release action can either be performed by outside intervention or by an automatic release mechanism that can release the tether.

Another application of the present invention is to destroy underwater structures. For instance, dams, bridges, offshore oilrigs, offshore wind turbines, undersea cables, undersea communication infrastructure, undersea oil and gas lines, and many other structures have underwater portion. The present invention can be deployed and instructed to destroy the underwater portion structures. The precise positioning capability of the system provides an advantage in locating the place to detonate in order to achieve satisfactory result.

Yet another application is to clear ice over the surface of water. The traditional method is to apply the crushing force of an icebreaker vessel to clear a path on ice locked sea. One embodiment of the present invention can navigate under the ice and carry out this task. The system is submerged underneath the ice layer through small openings. Multiple explosive devices are tethered with certain intervals in between them. At least one UUV moves along the path waiting to be cleared. The explosive devices thus form a line underneath the ice. Each of the explosive device is able to receive detonation instruction individually. Similar to controlled demolition of buildings, the timing of detonation of each explosive device makes a difference on the effectiveness of clearing the ice above. After all the detonation, a path of waterway is created. Explosive placed above the ice has far less effect on ice than if placed underneath the ice. The ice has strong support from underneath because it floats atop the water. The pressure exerted from above the ice surface has less effect compared to if the pressure from underneath the ice. Explosion in water causes the water to push upward against the ice. This pressure is also considerably larger than the air pressure pushing the ice if the explosion takes place above the ice. Therefore this underwater explosion method is more effective than other above the ice explosion methods. The vessels that are locked by ice can simply carry this embodiment of the present invention, and need not wait for others to rescue.

Another application of the present invention is to change the course of iceberg. In this embodiment, the explosive devices are optional. In the operation of moving the iceberg, the tethers of the present invention are fully extended. Subsequently, the two UUVs move around the iceberg in differing directions, thus the tethers are to encircle the iceberg. Once the encirclement around the iceberg is secured, the UUVs move toward the same direction, which is the desired course of the iceberg. A tugboat may be subsequently used to collect the tethers from the UUVs, and continue the dragging. This embodiment of the present invention can prevent iceberg from ramming into vessels, such as Titanic. In this embodiment, the explosive devices are optional. Tugboats alone can move an iceberg if desired. But traditional tugboats have hard time submerging the tethers at an ideal depth to attach to the iceberg. The present invention has depth control module so it is not a problem. The depth choice for the tethers to attach to the iceberg is important, because of the fact that the bulk of the iceberg is submerged. If the tether is just attached to the portion of the iceberg at or above the sea level, the torque exerted by the dragging is not very effective in moving the iceberg. However, if the tethers are around the girdle of the iceberg around the middle portion, the torque achieves better tugging result. This method is not only safer but also more effective in moving an iceberg.

Yet another application of the present invention is to break icebergs into smaller pieces. An iceberg is not a uniform structure. There are weak spots such as fissures and caves in the iceberg, but they are usually underneath water. The present invention is able to identify those strategic spots through the Command Center or onboard sensors. The system then moves close to one such weak spots and detonates. If the iceberg is broken it poses less of a threat to vessels.

Yet another application is to use the present invention to weave an underwater interception net. The UUVs are used as shuttles and the tethers are used as thread, just to borrow the analogy from weaving. In order to fix the net, some fixed structures are needed such as hooks on a fixed chain or a column. Alternatively, the tethers can be fixed with naturally existing structures such as stones, or coral reefs. The weaving takes place when the UUVs are moving in coordinated patterns with the tethers being dragged by them. The resulting net made by the tethers are used to intercept enemy submarines or other underwater objects. A Submarine typically has protruding structures such as a sail and tailplanes, as well as at least one propeller. Once the tethers got into contact with a moving submarine, the protruding structure drags the tethers and thus entangles the submarine with the tethers and likely the whole net. The propeller of the moving submarine is also vulnerable to be entangled by the net. If the explosive device is affixed on the net, it will result in detonation. In one embodiment of the present invention, the UUVs are able to sense the approaching submarine through onboard sensors, or through the motion of the tethers, and use that information to instruct the explosive device to detonate. The net can be established dynamically in a battleground. One advantage of such net is its mobility. The net can provide a moving protection shield around moving friendly vessels against enemy submarine attack.

Another application is to confuse or deceive the enemy sonar detectors. Sonar is frequently used to identify underwater objects such as submarines. A type of passive sonar detector relies on sound waves bounced off the object. An embodiment of the present invention carries acoustic devices to mimic an underwater object's sound signature, such as a submarine. A plural of sound mimic devices are tied to the tethers with appropriate spacing between them. In this embodiment, the explosive devices are optional. A mimicking sound is played from the acoustic device or a group of them, in unison or in sequence. The goal is to fool the sonar detector to think of the presence of an underwater object, or a moving underwater objects. To mimic a moving object, a simulated sound is played sequentially along a long tether by each of the sound device. For example, the tether forms a line underwater, and the sound devices are tied to the tethers in proper intervals. One sound device plays a mimic torpedo characteristic sound for a short duration and then let the next adjacent sound device to play the next short round of sound. The relay of sound is analogous to sequentially flashing light bulbs in a line as in a decorative lighting. Both make moving object illusions, but one by sound and the other by light. It would be indistinguishable for enemy sonar to tell if this is a mimic sound signature of a torpedo or a real one. A submarine can be mimicked in similar fashion. Because the tethers may run in miles, there is no need to move the UUVs at high speed, as a normal torpedo or submarine does. The mimic sound played sequentially along the tether line is sufficient to deceive the sonar detectors into thinking a fast moving underwater object. In the meantime, the UUVs are changing positions for the next round of sequential sound play. In addition, the sound device can mimic a depth charge being dropped into sea to fool a submarine. In this case, the tether needs to be placed in as a line pointing downward. Each of the tethered sound devices plays a mimic depth charge characteristic sound in sequence. Furthermore, the sound devices are able to mask objects' sonar signature by playing blocking or jamming noises at a desired depth, bearing and orientation.

Another application is to tie a plural of sonar detectors on the tether for form a sonar array. In this embodiment, the explosive devices are optional. Typically, a vessel is used to carry tethered sonar array at present. The embodiment of the present invention is able to move the tethered sonar array at chosen depth, orientation and location automatically. The detected signals are sent to the UUVs, which in turn relay them back to the Command Center. In one embodiment, the signal travels a fiber optics or a wire that is running parallel to the tethers from the sonar detectors to the UUV. In another embodiment, each sonar detector emits light as well relay lights from an adjacent sonar detector. The signals detected by a sonar device are translated into on-off light signals and then are transmitted to an adjacent sonar device. The sonar device closest to the UUV is able to send the light signal to the UUV. The UUV translate the light signal into sonar detection signals.

One of the embodiments of the invention is designed for air deployment. By using manned or unmanned air deployment, the systems can be projected speedily in a vast water territory.

An embodiment of the present invention can be combined with Unmanned Arterial Vehicles (UAVs), which is also referred as 'drone' sometimes. One example of such UAV is X-47B made by Northrup Grumman. An UAV may carry one or many an embodiment of the present invention. The UAV flies over the water territory and releases the system from air. This type of deployment reduces human intervention and human causalities. The automation aspect presents this combination as an attractive option in future warfare.

Large number of deployment of a variety of embodiments of the present invention could become a strategic choice for the navy. The Command Center is able to know the specific locations and status, and to maintain control the widely dispersed assets across a vast water body. The numerous systems are mobile, effective, versatile, inexpensive and stealthy.

DETAILED DESCRIPTION

Figure 1:
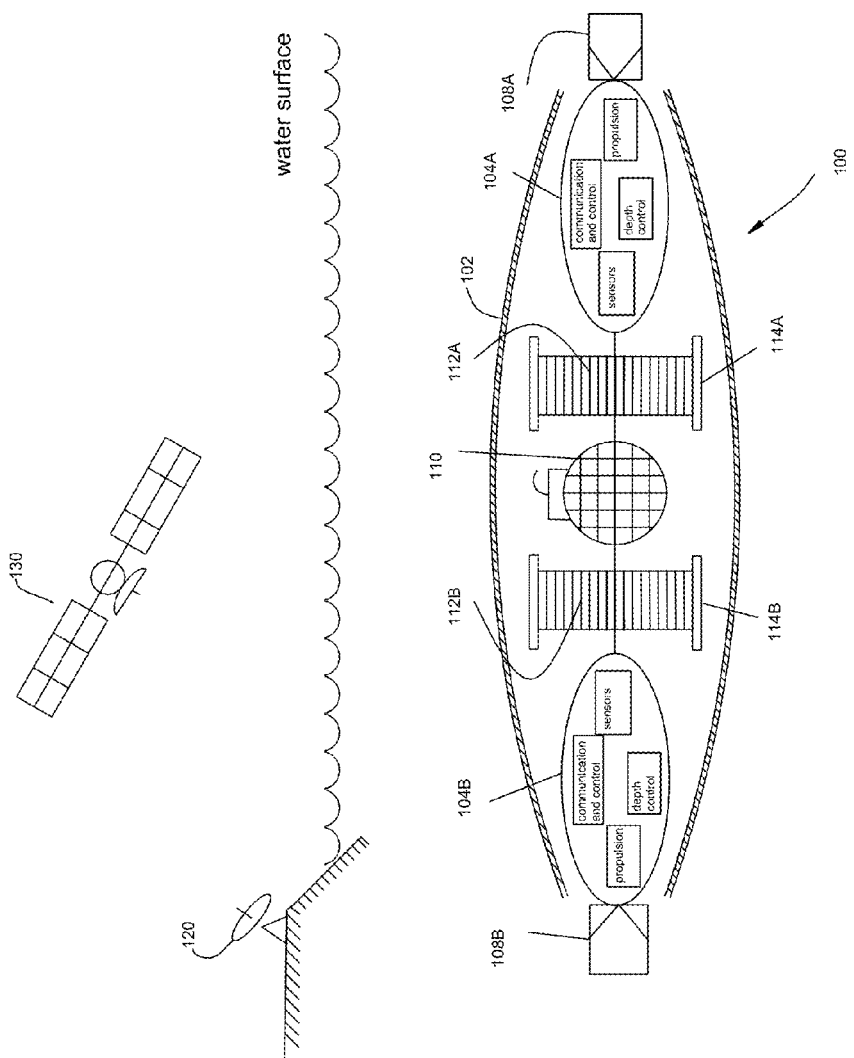
FIG. 1 depicts the system with the detachable housing submerged underwater.

The illustrative embodiment of a system for engaging target vessel comprises:
at least one strand of tethers;
at least one explosive device; and
at least one UUV;

In FIG. 1, 100 depicts the side view of the system submerged in water. The detachable housing is depicted in 102. The housing is made to be liquid dynamic, as illustrated in the FIG. 1. It has two openings on both ends to allow the propulsion component of the UUVs to expose in the water. The propulsion of the UUVs provides mobility to the whole system. However, standalone propulsion system is an option too in other embodiments. The design depicted in FIG. 1 allows bi-directional movement when the two UUVs coordinate movements. This design makes the embodiment of the present invention highly mobile. It has very small turning around radius, compared to single propulsion method. The material of the housing is chosen based on the following consideration: lightweight, radio signal reflection neutral and durable in submerge environment. Certain engineering plastics are good choice. The housing and compact structure also protects the system from the interference of marine lives.

The UUVs are depicted in 104A and 104B. They are arranged so that their propulsion portion of 108A and 108B are exposed in water to provide mobility. In one embodiment, the power comes from two sources under different operating mode. The operating modes primarily include patrol mode and engagement mode. In patrol mode, the power may be drawn from the environment such as wave envery or solar energy. The whole system may not be required to move in a speedy fashion. In engagement mode, the power comes from the batter onboard each of the UUVs. The battery power enables high speed and thus higher mobility.

112A and 112B are the tethers coiled on to spools 114A and 114B, respectively. The embodiment illustrated in FIG. 1 shows that the spools 114A and 114B are separate from the UUV 114A and 114B, respectively. In another embodiment, the spools 114A and 114B are combined with the UUV 114A and 114B, respectively, hence the spool moves with the UUV while the tethers are extended.

The tethers 104A and 104B are made from high strength material, such as Kevlar. The tether consists at least one strand of filament. For added strength, thicker rope made from high strength material should be used as the tether.

The explosive device 110 is shown only one in this embodiment. However there could be a plurality of explosive devices in other embodiment. The heterogeneous explosive devices may be used for different purposes and serve different needs. Traditional sea mines could be used with some modifications as the explosive device in some embodiments. The explosive device has its own buoyancy as a typical sea mine does. The explosive device detonates upon receiving signal from the UUVs or the Command Center. Traditional detonation mechanism is still preserved, such as impact detonation. Some existing explosive devices consists of magnet that enable them to attack hulls made of steel. This type of magnetic explosive devices work well with the tethers and UUVs.

The satellite 130 in FIG. 1 establishes communication link between the Command Center 120 and the UUVs 104A and 104B.

In other embodiments, the layout of each device in the detachable housing varies, depending on the actual size and physical characteristics. For instance, in one embodiment, the two UUVs are stacked on top of each other and their heads are in different direction. The spools of tethers and the explosive device are on their sides.

Figure 2:
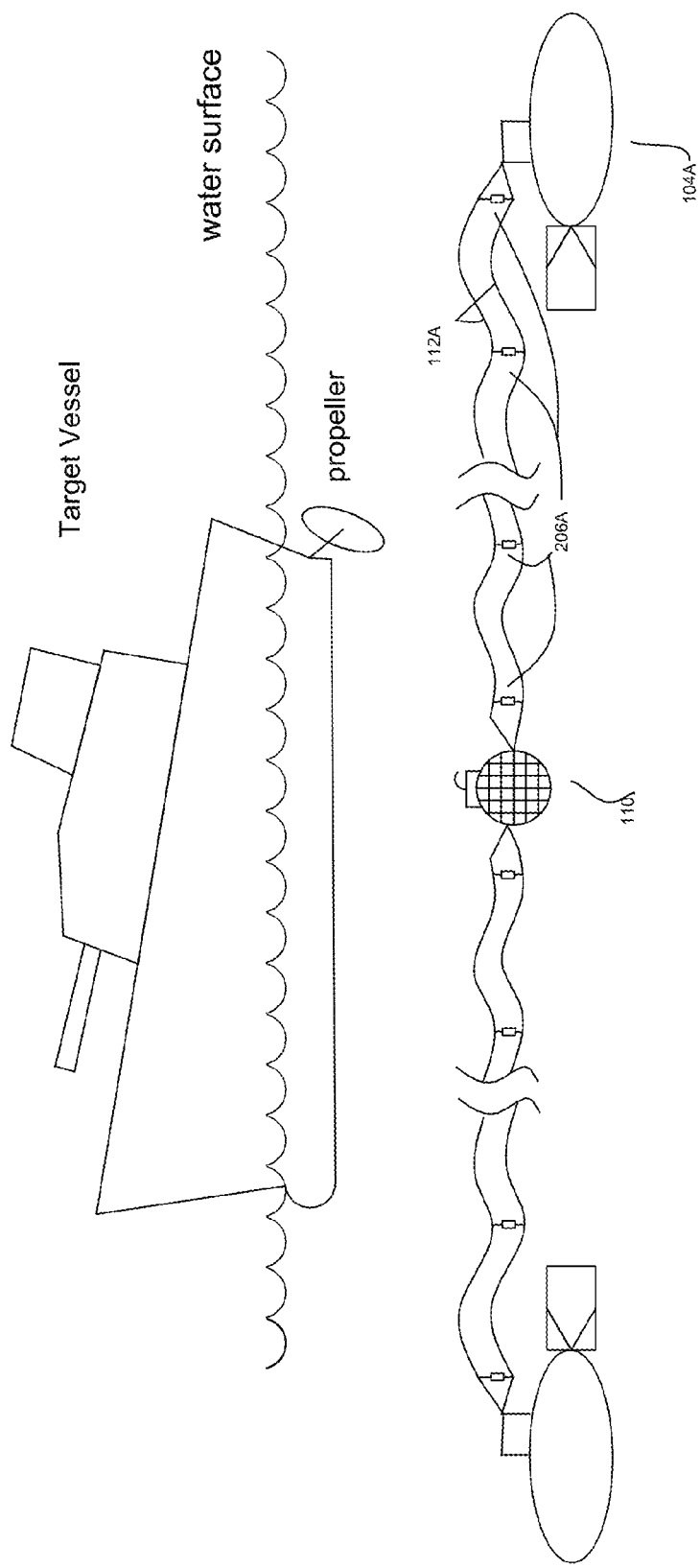
FIG. 2 depicts one embodiment wherein the tethers are fully extended, and ready to engage the target vessel.

FIG. 2 depicts the system with fully extended tethers. The system is ready to engage with the target vessel. The system receives instructions from the Command Center or automatically performs this extension action. The length of the tether varies depending on the intended application. The tether length can be miles long or can be considerably shorter than that. In order to achieve proper depth, a plural of submersible separating structure 206A are used to provide buoyancy and avoid entanglement of the tethers by themselves. In one embodiment of the present invention, the separating structure has its own GPS sensor, a module to communicate wirelessly with the UUVs, and a miniature propulsion of its own. The requisite power may be drawn from the environment, such as solar or wave energy, or from battery. With each structure has its own propulsion and intelligence from the wireless communication, the movement of the tethers would be greatly enhanced. The control of the tether is down to the granularity of the segment between two such separating structures.

The explosive device is depicted in 110.

Figure 3:
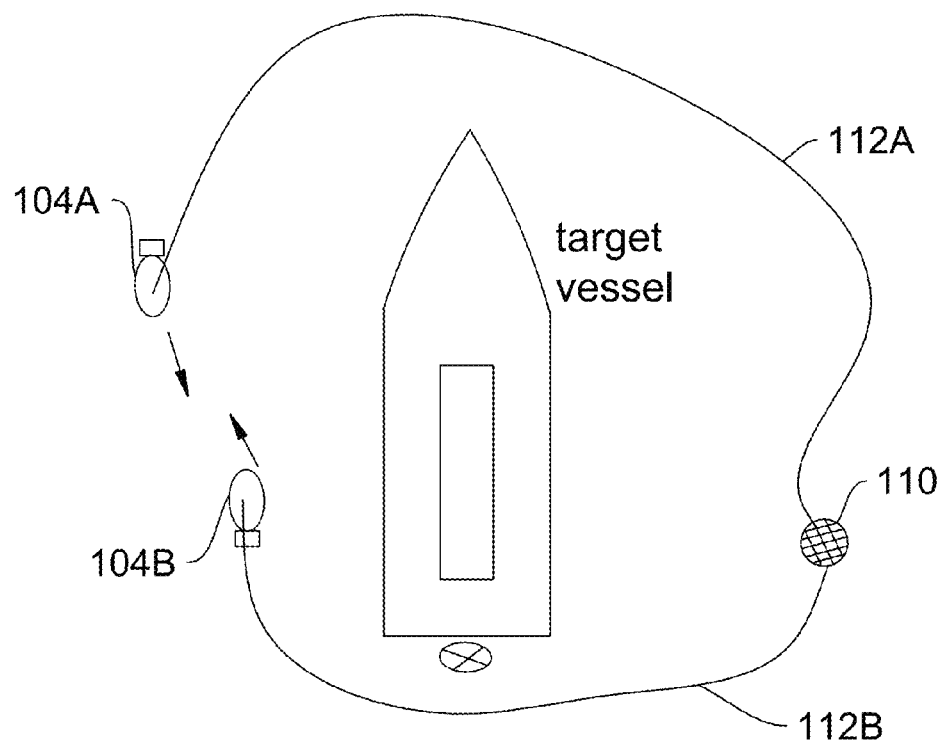
FIG. 3 depicts the encirclement by the system while in engagement mode.

FIG. 3 depicts the encircling movement of the system. Once the target vessel is identified, one of the UUVs 104B moves in clockwise direction while the other 104A moves in counter clockwise direction, thereby the target vessel is encircled. The tether 112A and 112B will eventually make contact of the hull of the target vessel. If the target vessel continues to move, the motion is likely to result in the explosive device 110 being dragged to the proximity of the hull. In addition, the UUVs move the tethers toward the target vessel's propeller for entanglement. In both scenarios, the explosive device 110 is detonates when it's close to the hull.

Figure 4:
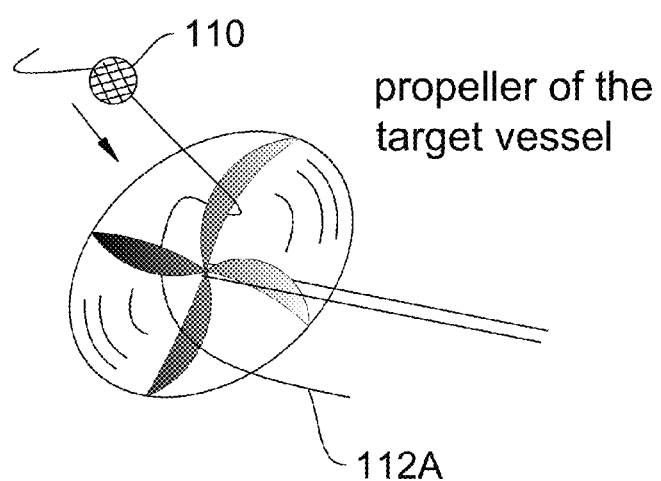
FIG. 4 depicts the tether being entangled by the target vessel's propeller, and the explosive device being dragged toward the vessel.

FIG. 4 depicts the entanglement of the tether 112A with the target vessel's propeller. The propeller's revolution agitates surrounding water, which attracts the tether. Given the light weight of the tether, the attraction because of the water flow makes the tether easy to access the propeller. In addition, the maneuvers of the UUVs also help the tether entangle the target vessel's propeller.

The system is able to self-destroy either by instruction from the Command Center or from onboard communication and control unit. This self-destroy function is useful when the system is facing capturing or is deemed necessary to be taken out. Once the self-destroy instruction is received, the explosive device will detonate no matter what mode the system is in.

Figure 5:
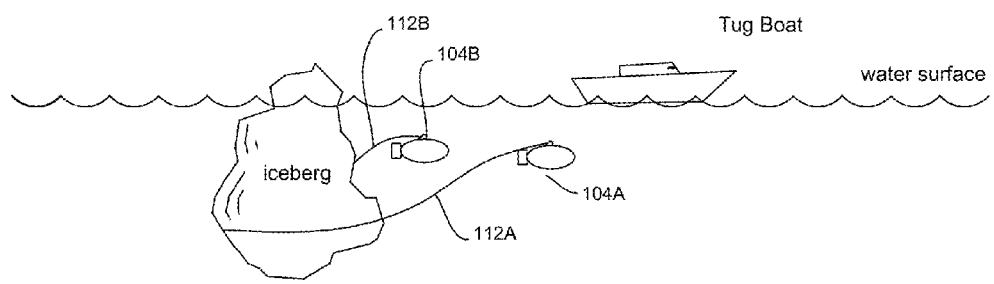
FIG. 5 depicts the dragging of an iceberg by the present invention

FIG. 5 depicts the moving of an iceberg using one embodiment of the present invention. The UUV 104A and 104B move around the iceberg, so the tether 112A and 112B can wrap around the girdle. The choice of where to secure the tethers matters, therefore the system needs to figure out where the tether should make contact with the iceberg. The UUVs move closer to the tugboat, which in turn picks up the tethers from the UUVs. The tug boat provides more powerful tugging ability than the UUVs.

Figure 6:
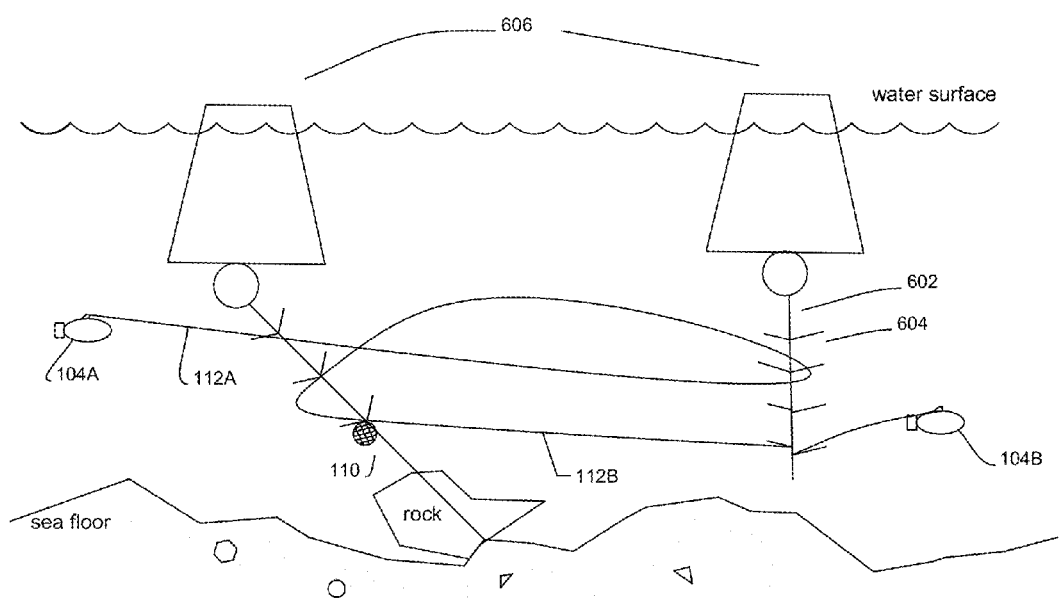
FIG. 6 depicts the system using the tethers and the UUVs to weave an interception net.

FIG. 6 depicts the interception net is being woven by the present invention. One embodiment of the present invention is used with the help of floating platforms 606. The floating platforms 606 have long chains 602 extending from the platforms' bottoms. On each chain there are multiple hooks 604 designed to catch the tethers. The UUVs 104A and 104B are used like a shuttle to wave the tethers 112A and 112B in between the hooks 604, thereby forming an interception net. The platform 606 is a permanent or temporary floating structure, which could be floating bridge, buoy, vessel, semi submerged oilrig, and other types of structures. The explosive device 110 is also useful if the enemy submarine is entangled in the net. The interception net is dynamically generated. Is useful in battlefield situations because of its versatility, flexibility and mobility. The net may move along side a friendly vessel, fending against possible enemy submarine's attack.

Figure 7:
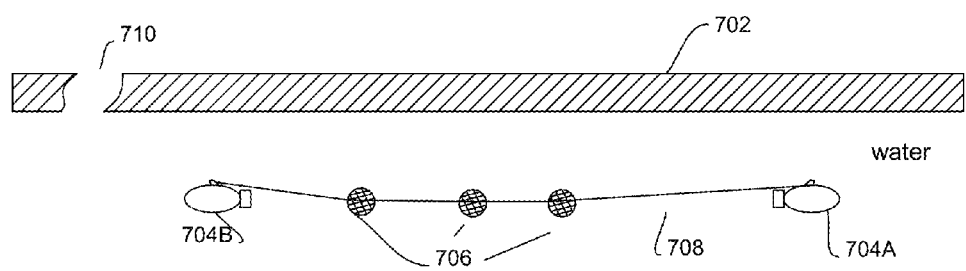
FIG. 7 depicts the ice breaking method with one embodiment of the present invention.

FIG. 7 depicts the method of breaking ice with one embodiment of the present invention. The system got underneath the ice though an opening on ice 710. Once in water the tethers 708 are extended by the movement of UUV 704A and 704B. A plurality of explosive devices 706 are tethered to form a line. Then the explosive devices are detonated in a controlled manner. The explosion will cause the ice above to break thereby a water way is cleared for navigation.

Figure 8:
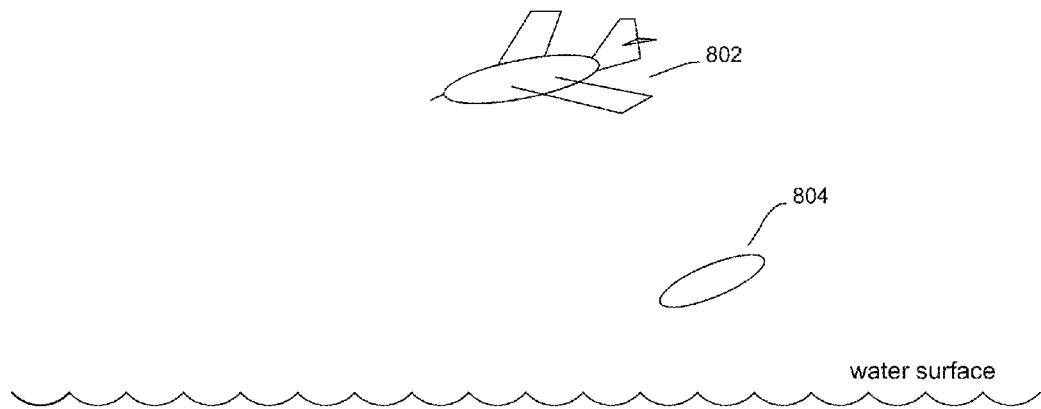
FIG. 8 depicts the deployment from air by a UAV.

FIG. 8 depicts the deployment of the system from a UAV. The UAV 802 carries the system 804 under its fuselage or its weapon bay. The system 804 is then released from air to water.

In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A system for navigating and positioning tethers and tethered devices into desired locations for military and civil applications, comprising:
    at least one UUV;
    at least one device; and,
    at least one tether that links the at least one UUV and the at least one device;
    at least two strands running in parallel and spaced by a plurality of separating structures between them;
    wherein the separating structure comprises a propulsion unit.

2. The system according to claim 1, the tether further comprising: a material that has at least 200 MPa in tensile strength.

3. The system according to claim 1, wherein the at least one device comprises explosive devices or acoustic devices.

4. The system according to claim 1, further comprising the at least one UUV, the at least one tether and the at least one device housed in a detachable structure.

5. A method of navigating and positioning a plurality of tethers and a plurality of tethered devices to desired locations, comprising moving the plurality of tethers and the plurality of tethered devices by movements of a plurality of UUVs;

wherein two of the plurality of UUVs move around a vessel in differing directions to encircle the vessel.

6. The method of claim 5, further comprising the steps:
(a) providing at least one of a tethered UUV;
(b) moving the at least one of the plurality of tethers to the proximity of a sea going vessel's propeller; and
(c) entangling the sea going vessel's propeller with the at least one of the plurality of tethers.

7. The method of claim 5, further comprising dragging of the plurality of tethers by any portion of a vessel.

8. The method of claim 5, further comprising the steps of:
(a) the at least one of the tethered UUV navigating to desired positional coordinates; and
(b) detonating an explosive device by its own detonation mechanism, or a signal from the at least one of the tethered UUV, or a signal from a Command Center.

9. The method of claim 5, further comprising the steps:
(a) moving at least one of the tethered UUVs so that the plurality of tethers are underneath ice to be cleared; and
(b) detonating a plurality of explosive devices.

10. The method of claim 5, further comprising the steps:
(a) the UUVs moving in differing directions, such that the plurality of tethers are securely around an iceberg; and
(b) the UUVs dragging the plurality of tethers to prescribed locations.

11. The method of claim 5, further comprising the steps:
(a) moving a plurality of explosive devices to the proximity of an iceberg by the movement of the UUVs; and
(b) detonating the plurality of explosive devices.

12. The method of claim 5, further comprising the steps:
(a) the plurality of tethers being extended at a desired depth, orientation and length by the movements of the UUVs; and
(b) a plurality of acoustic devices emitting sound signals sequentially along the tethers to mimic moving underwater objects.

13. The method of claim 12, further comprising the steps:
(a) the acoustic device emitting a jamming sound to mask a sound emanated from an underwater object.

14. The method of claim 5, further comprising the steps:
(a) an acoustic device being sonar detectors;
(b) the sonar detectors detecting a plurality of sonar signals; and
(c) a plurality of detected signals being transmitted to the UUV or a Command Center.

15. The method of claim 5, further comprising the steps:
(a) each of the UUVs navigating in coordination with the other UUVs;
(b) dragging the plurality of tethers by the movement of the each of the UUVs; and
(c) affixing the plurality of tethers to structures during the movement of the UUVs.

16. The method of claim 5, further comprising the steps:
(a) a Command Center sending instructions to the UUVs using satellite links, or underwater acoustic signals, or direct wireless communication or through a cable; and
(b) the UUVs sending information gathered from their sensors and GPS location coordinates to the Command Center using satellite links, or underwater acoustic signals, or direct wireless communication or through a cable.

* * * * *